United States Patent [19]

Whitlow et al.

[11] Patent Number: 5,330,088

[45] Date of Patent: Jul. 19, 1994

[54] ELECTRICAL CONTACT CONTAINING A BRAZE DIFFUSION BARRIER

[75] Inventors: Graham A. Whitlow; Carl B. Freidhoff, both of Murrysville, Pa.; Philip E. Carpentier, Elmira; Paul O. Wayland, Montour Falls, both of N.Y.

[73] Assignee: Eaton Corporation, Cleveland, Ohio

[21] Appl. No.: 54,171

[22] Filed: Apr. 30, 1993

[51] Int. Cl.⁵ .................. H01H 1/02; B23K 31/02
[52] U.S. Cl. ............................ 229/179.1; 228/215; 228/254; 428/660; 428/929; 200/268
[58] Field of Search ................ 228/179, 215, 254; 428/660, 929; 200/267, 268

[56] References Cited

U.S. PATENT DOCUMENTS

| | | | |
|---|---|---|---|
| 2,427,727 | 9/1947 | Huntley et al. | 228/254 |
| 3,000,092 | 9/1961 | Scuro | 228/254 |
| 3,159,462 | 12/1964 | Kadelburg | 228/179 |
| 4,345,130 | 8/1982 | Okutomi et al. | 428/929 |
| 4,840,302 | 6/1989 | Gardner et al. | 228/254 |
| 5,076,486 | 12/1991 | Slemmons et al. | 228/179 |

FOREIGN PATENT DOCUMENTS 699585  11/1979  U.S.S.R. ...................... 200/267

Primary Examiner—P. Austin Bradley
Assistant Examiner—Jeffrey T. Knapp
Attorney, Agent, or Firm—Martin J. Moran

[57] ABSTRACT

A layer selected from a group comprising: molybdenum, tantalum, tungsten, osmium, rhenium, ruthenium and an alloy of two or more thereof on the under surface of an electrical contact acts as a barrier to copper diffusion from the braze material into the contact structure. A thin nickel layer on the barrier facilitates the brazing of the barrier coated contact surface to the copper electrodes.

14 Claims, 3 Drawing Sheets

500X

ELECTRICAL CONTACT CONTAINING A BRAZE DIFFUSION BARRIER

BACKGROUND OF THE INVENTION

This invention relates to electrical contacts and more particularly the manner of attaching an electrical contact to an electrode. This invention has specific application to a structure in which a contact is brazed to the electrode and a barrier layer is provided between the brazing material and the contact to prevent elemental diffusion into the contact.

BACKGROUND INFORMATION

It is common to attach an electrical contact to an electrode by brazing. Typically, the contact is made of an alloy selected to provide the proper electrical properties of the contact. Traditionally, when the contact is brazed to the electrode to form an electrode-contact sub-assembly there is a diffusion of elements from the braze material into the contact, but unless this diffusion depth is minimized it can have an adverse effect on the contact. For instance, when a contact is brazed to a copper electrode a good bond is formed between the copper electrode and the contact by using a brazing alloy containing copper. However, copper from the brazing alloy diffuses from the alloy into the virgin contact along a diffusion front. The extent of the diffusion depth into the contact should be minimized because it is a potential source of mechanical weakness and if it reaches all the way through the contact, the contact may have totally different electrical characteristics than those required for efficient functioning of the device.

A novel and improved mode of limiting the observed diffusion into the contact by the incorporation of a diffusion barrier has been developed that has many technical advantages over the current state of the art.

OBJECTS OF THE INVENTION

Accordingly, it is an object of the invention to limit elemental diffusion into the contact by incorporation of an impermeable barrier between the braze material and the contact.

It is another object of the invention to prevent degradation of the electrical characteristics of the contact which are required for efficient functioning of the device.

It is yet another object of the invention to eliminate a potential source of mechanical weakness in the contact.

SUMMARY OF THE INVENTION

We have discovered that this deleterious diffusion of copper into the contact can be prevented by placing an impermeable barrier layer between the braze material and the contact. The material for this barrier may be any element or alloy which does not alloy with the species that is being prevented from diffusing into the contact material. For example, in attempting to prevent copper from the braze alloy from diffusing into a silver-tungsten carbide contact, a suitable barrier material with which copper does not alloy or exhibit any solid solubility is molybdenum. Other materials which are also effective include tantalum, tungsten, osmium, rhenium and ruthenium as well as alloys of two or more thereof.

To facilitate the brazing of the diffusion barrier material to the copper electrode, it is desirable to provide a transition layer of a metal that will braze to the electrode and adhere to the barrier layer material. For example, a thin layer of nickel is found to be satisfactory.

In the preferred embodiment of the invention, the contact is an alloy chosen from a group comprising silver-tungsten, silver-tungsten carbide, and copper-chromium systems sometimes with the addition of other elements; and the electrode is copper.

The barrier layer material may be deposited on the contact by a process selected from a group comprising thermal decomposition, evaporation, sputtering, chemical vapor deposition and plating and the transition layer is applied to at least one of the barrier layers and electrodes before brazing.

The typical thickness for the barrier layer is about 0.5 to 5 mils and the transition layer has a thickness of about 0.2 to 2 mils. The preferred thickness is about 1 to 2 mils for the barrier layer and about 0.2 to 1 mil for the transition layer.

BRIEF DESCRIPTION OF THE DRAWINGS

A full understanding of the invention can be appreciated from the following detailed description of the invention when read with reference to the accompanying drawings wherein.

DESCRIPTION OF THE PREFERRED EMBODIMENTS

As an example only, the invention will be described as applied to a vacuum interrupter although it could be used in a variety of electrical devices.

Figure 1:
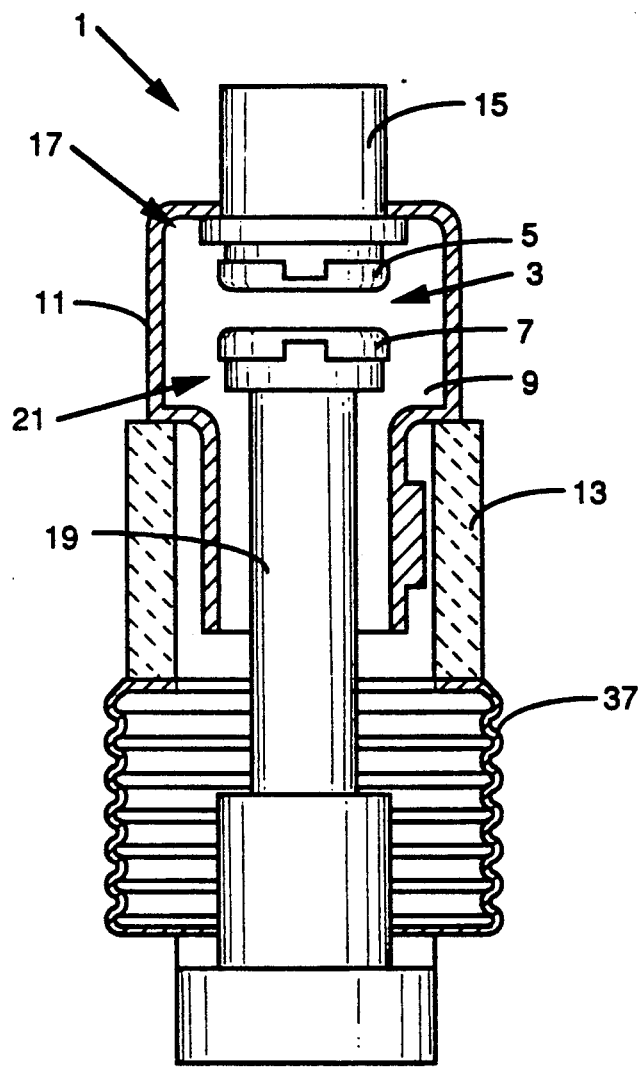
FIG. 1 shows a longitudinal section through a vacuum interrupter having a contact-electrode sub-assembly to which the invention may be applied.

FIG. 1 shows the basic contact and its arrangement in a device such as a vacuum interrupter. In FIG. 1, the vacuum interrupter 1 includes a pair of electrical contacts 3, comprising a fixed or stationary contact 5 and a moveable contact 7. The contact pair 3 is housed in a vacuum chamber 9 formed by a housing 11 and a ceramic bottle 13. The stationary contact 5 is secured to an electrode 15 to form a stationary contact-electrode sub-assembly 17. The moving contact 7 is secured to an electrode 19 to form a moving contact-electrode sub-assembly 21. This moving contact-electrode sub-assembly 21 is moved by an actuator (not shown) between the open position as shown in FIG. 1 in which the contacts 5, 7 are separated and a closed position (not shown) in which the contacts are closed to complete an electrical circuit through the vacuum interrupter. A bellows 37 maintains the vacuum in the vacuum chamber as the moveable contact-electrode sub-assembly 21 is operated between the open and closed positions.

Figure 2A:
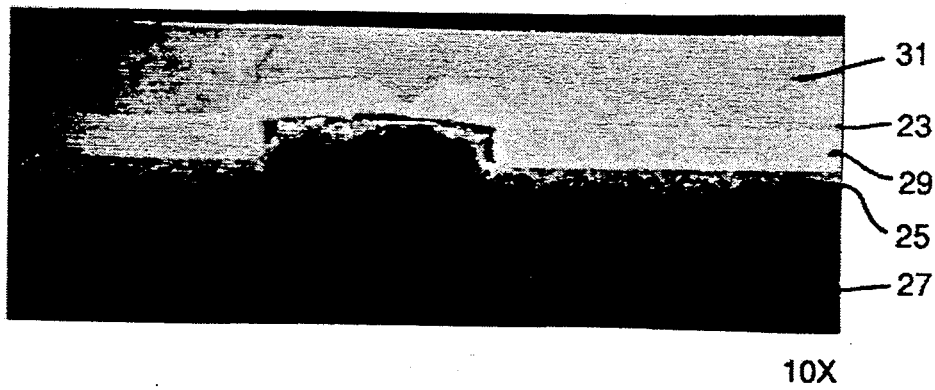
FIGS. 2a and 2b are photomicrographs at 10× and 40+ through a contact-electrode sub-assembly in accordance with the prior art showing the extent of the copper diffusion from the braze.
Figure 2B:
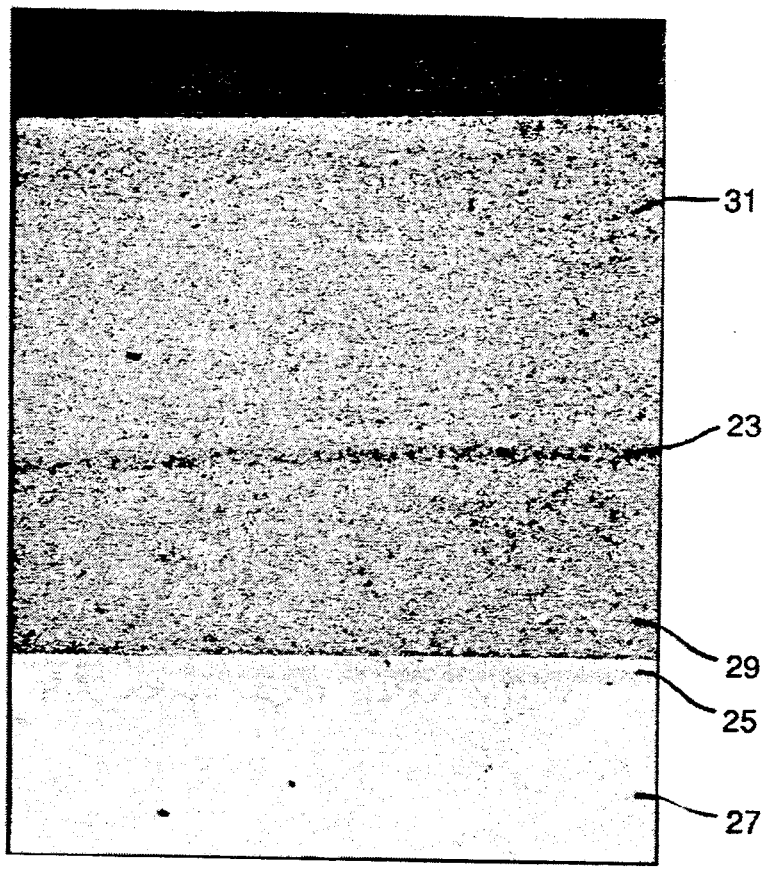

As in the common current practice, the contacts are brazed to the respective electrodes. One potential problem that may arise is that during thermal cycles incurred in the assembly of a device such as a vacuum interrupter, movement of one or more of the chemical elements making up the contact-electrode sub-assembly can occur along a diffusion gradient. For example, FIGS. 2a and 2b, two photomicrographs at 10× and 40× respectively illustrate movement of copper out of the silver-copper brazing alloy used to join the copper electrode and contact into the silver-tungsten carbide contact. The horizontal line 23 which marks the limit to which the diffusion has moved is clearly seen in FIGS. 2a and 2b. The above photomicrographs taken through the contact show the copper diffusion from the braze. The area 27 corresponds to the area of the copper electrode, 25 is the braze material, 29 is the copper diffusion zone from the braze material and 31 shows the unaffected region of the contact.

In accordance with our invention, we have confirmed by electron probe microanalysis that elemental diffusion from the braze into a contact has been prevented by providing a barrier layer on the contact. The barrier layer is of a material that does not alloy or exhibit any solid solubility with any element of the braze. A suitable barrier material is selected from the group comprising: molybdenum, tantalum, tungsten, osmium, rhenium and ruthenium and an alloy of two or more thereof.

In order to facilitate the brazing of the diffusion barrier material to the copper electrode, it is desirable to have a transition layer of a metal that will braze to the electrode and adhere to the barrier layer material. In our example, a thin layer of nickel was found to be satisfactory.

The barrier layer material is deposited on the back of the contact by a process selected from a group comprising thermal deposition, evaporation, sputtering, chemical vapor deposition and plating, and a transition layer is applied to at least one of the barrier layers and electrodes before brazing.

Typical thickness for the barrier layer and the transition layer is about 0.5 to 5 mils for the barrier layer and about 0.2 to 2 mils for the transition layer. The preferred thickness is about 1 to 2 mils for the barrier layer and about 0.2 to 1 mil for the transition layer. The barrier layer thickness may be increased if the number and extent of any thermal cycles seen by the contact-electrode sub-assembly during assembly and service should increase.

EXAMPLE

The invention was applied to a silver-tungsten carbide contact attached to a copper electrode by brazing. A barrier layer of 1 mil thickness was deposited on the contact by diode sputtering of molybdenum A 0.2 mil thick transition layer was applied to the barrier layer by diode sputtering of nickel before brazing. The braze consisted of 65% Ag; 28% Cu; 5% Mn and 2% Ni.

Figure 3:
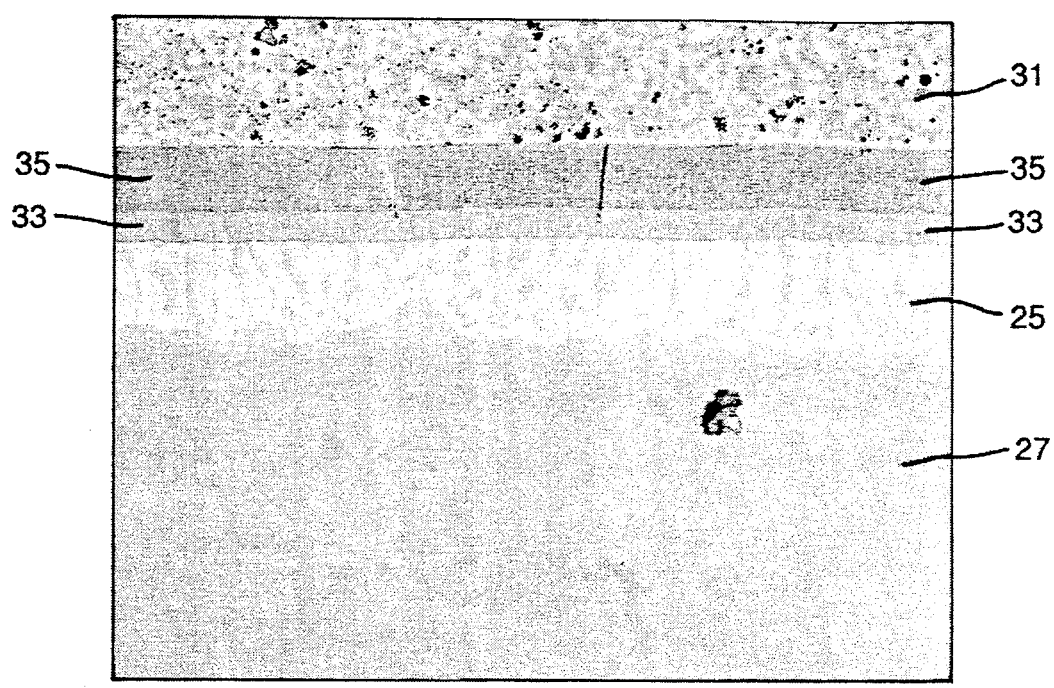
FIG. 3 is a photomicrograph at 500× through a contact-electrode sub-assembly showing the prevention of copper diffusion from the braze into the contact using a barrier layer and a transition layer in accordance with the invention.

FIG. 3 illustrates, in a photomicrograph taken at 500× the cross-section taken through the electrode-contact sub-assembly, the effectiveness of a molybdenum barrier layer and a nickel transition layer in the prevention of copper diffusion into the contact. In FIG. 3, the photomicrograph at 500× shows the copper electrode 27, the braze material 25, the nickel transition layer 33, the molybdenum barrier layer 35, and the contact 31. As can be seen, the barrier layer was effective in preventing copper from diffusing into the contact. This was confirmed by electron probe microanalysis, which showed the absence of copper in the contact.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

We claim:

1. An electrode-contact device comprising:
   a copper electrode;
   an electrical contact member having a contact surface;
   an impermeable barrier layer, deposited on the surface of the contact in juxtaposition to the electrode; and
   the contact member being attached to the electrode by brazing the impermeable barrier layer to the electrode, wherein a braze material contains copper and the barrier layer prevents copper diffusion from the braze material into the contact.

2. The device of claim 1, wherein the barrier layer is selected from a group comprising: molybdenum, tantalum, tungsten, osmium, rhenium, ruthenium and an alloy of two or more thereof.

3. The device of claim 2 wherein the contact is selected from a group comprising: silver-tungsten, silver-tungsten carbide and copper-chromium systems.

4. The device of claim 3 wherein the barrier layer is applied to the contact and a transition layer is applied to at least one of said barrier layer and said electrode before brazing.

5. The device of claim 4 wherein the transition layer is nickel.

6. The device of claim 5 wherein the barrier layer has a thickness of about 0.5 to 5 mils and the transition layer has a thickness of about 0.2 to 2 mils thick, 7. The device of claim 6, wherein the barrier layer is about 1 to 2 mils thick and the transition layer is about 0.2 to 1 mil thick.

8. A method of securing a contact surface to a copper electrode using a braze containing copper wherein the method comprises:
   applying by deposition an impermeable barrier layer to the contact surface for prevention of copper diffusion from the braze into the contact;
   placing the contact surface in juxtaposition to the copper electrode; and
   attaching the electrode to the contact surface by brazing the impermeable barrier layer to the electrode.

9. The method of claim 8, wherein the barrier layer is deposited on the contact by a process selected from a group comprising: thermal deposition, evaporation, sputtering and plating.

10. The method of claim 8 wherein the barrier layer is selected from the group comprising: molybdenum, tantalum, tungsten, osmium, rhenium, ruthenium and an alloy of two or more thereof.

11. The method of claim 10, wherein the contact is selected from a group comprising: silver-tungsten, silver-tungsten carbide and copper-chromium systems.

12. The method of claim 11 wherein the barrier layer is applied to the contact and a transition layer is applied to at least one of the barrier layer and the electrode before brazing.

13. The method of claim 12, wherein the transition layer is nickel.

14. The method of claim 13 wherein the transition layer is applied to the barrier layer and brazed to the electrode.

* * * * *